April 14, 1931.  F. H. VAN HOUTEN  1,800,417
DOUGH MOLDING APPARATUS
Filed April 28, 1926   5 Sheets-Sheet 1

Fig.1.

Inventor
Frank H. Van Houten
By Church & Church
his Attorneys

April 14, 1931.  F. H. VAN HOUTEN  1,800,417
DOUGH MOLDING APPARATUS
Filed April 28, 1926   5 Sheets-Sheet 3

Inventor
Frank H. Van Houten
By
Attorneys

April 14, 1931.  F. H. VAN HOUTEN  1,800,417
DOUGH MOLDING APPARATUS
Filed April 28, 1926   5 Sheets-Sheet 4

Inventor
Frank H. Van Houten
By [signature]
his Attorney

April 14, 1931.  F. H. VAN HOUTEN  1,800,417
DOUGH MOLDING APPARATUS
Filed April 28, 1926   5 Sheets-Sheet 5

Patented Apr. 14, 1931

1,800,417

UNITED STATES PATENT OFFICE

FRANK H. VAN HOUTEN, OF BEACON, NEW YORK, ASSIGNOR TO DUTCHESS TOOL COMPANY, OF BEACON, NEW YORK, A CORPORATION OF NEW YORK

DOUGH-MOLDING APPARATUS

Application filed April 28, 1926. Serial No. 105,179.

This invention relates to dough working apparatus and particularly to a machine for molding lumps of dough.

In the present type of molding machine the lumps of dough are delivered from a hopper to what are called sheeting rolls whose function is to reduce the lump of dough to sheet-like formation. From the sheeting rolls the dough passes to means for spirally rolling or curling the sheet into a lump which is then delivered to the kneading mechanism of the machine, such kneading mechanism consisting of a relatively fixed pressure plate which receives the spirally wound lumps of dough and along which said lumps of dough are caused to travel by an endless belt. Having traversed the length of the pressure plate the kneaded lumps of dough are delivered from the machine to a suitable receptacle.

As it is desirable to vary the size of the finished molded lump of dough the present invention contemplates the provision of a pressure plate which may be adjusted toward or from its cooperating traveling endless belt, this adjustment being accomplished in such wise as to maintain the pressure plate parallel to said belt. In this connection a further object is to provide means for facilitating adjustment of the sheeting rolls as it will be apparent that when the space between the pressure plate and traveling belt is increased the thickness of the sheet of dough formed by the sheeting rolls must also be increased so that the convolutions of the spirally rolled lumps of dough will produce a lump of sufficient diameter to engage both the pressure plate and the traveling belt when said lump is passed to the kneading mechanism. On the contrary when the space between the pressure plate and traveling belt is reduced the sheeting molds should be adjusted in closer relation so as to reduce the thickness of the sheet of dough which is to be subsequently curled into a ball and delivered to the kneading mechanism.

A further object is to mount the endless traveling belt in the machine by means which will permit of its being readily removed from proximity to the pressure plate, thus facilitating cleaning the latter.

Another object consists in the provision of means for rendering the endless traveling belt readily removable from the rollers upon which it travels. This is preferably accomplished by having the belt carried on a belt frame comprising two rollers on which the belt travels, one of said rollers at one end of the frame being pivoted in suitable bearings on the main frame and the other roller being journaled in the opposite or free end of said frame. One of the bearings for the roller at the pivoted end of the frame is removable so that by removing said bearing the belt may easily be slipped laterally from the rollers in the belt frame.

It sometimes occurs that an abnormal lump of dough will be delivered from the hopper to the sheeting rolls and if such abnormal quantity of dough should reach the kneading mechanism it will not travel along the pressure plate properly but, on the contrary, will have a tendency to stick either to the plate or belt. For this reason means are provided in the present instance for detecting such abnormal lumps of dough as they pass from the sheeting rolls and diverting it from its normal passage to the kneading mechanism.

With these and other objects in view the present invention consists in certain novel details of construction and combinations and arrangements of parts, all as will be hereinafter more fully described and the novel features thereof particularly pointed out in the appended claims.

In the accompanying drawings,—

The molding machine illustrated in the present instance comprises a main frame 10 at one end of which there is mounted a motor 11 on a suitable shelf or support 12 on said frame. Journaled in upward extensions 10a of the main frame are a plurality of transverse shafts 13 carrying the usual sheeting rolls. Preferably there are two pairs of sheeting rolls spaced vertically from the frame members 10a, the upper shaft 13 having mounted thereon a sheeting roll 14 located in proximity to the discharge opening of the hopper 16 and spaced below said sheeting roll 14 is a second roll 15 mounted on the lower shaft 13. These sheeting rolls 14, 15 of the two pairs of rollers are journaled in fixed bearings but to permit of adjustment of the rolls of the respective pairs the other sheeting rolls 17 are journaled in bearings that may be moved toward or from rollers 14, 15. The preferred arrangement for providing for this adjustability for the sheeting rolls of each pair consists in mounting the rollers 17 on vertically spaced shafts 18 which are journaled in bearings 19 provided in a plate 20 at the ends of spindles 21 slidable in guides 22 in the frame extensions 10a. At their opposite ends the spindles 21 are exposed at the exterior of the machine frame at which point said spindles are connected by an end girt 23 and extending through said girt 23 is a jack screw 24 whose end is threaded in bracket 27. Said screw is free to turn in its bearing in girt 23 but, as will be understood, it is held against longitudinal movement relative to said girt whereby, by rotating the hand wheel 25 on said screw, the girt 23 may be moved toward or from the machine frame and consequently the rolls 17 which are carried at the opposite ends of the spindles 21 may be moved toward or from the sheeting rolls 14, 15.

Figure 7:
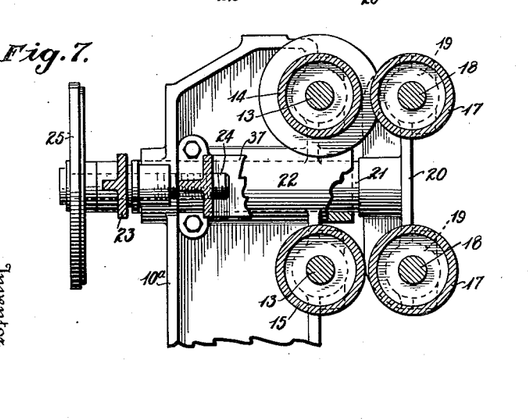
Fig. 7 is a vertical sectional view of the parts shown in Fig. 6.
Figures 8, 9, 10:
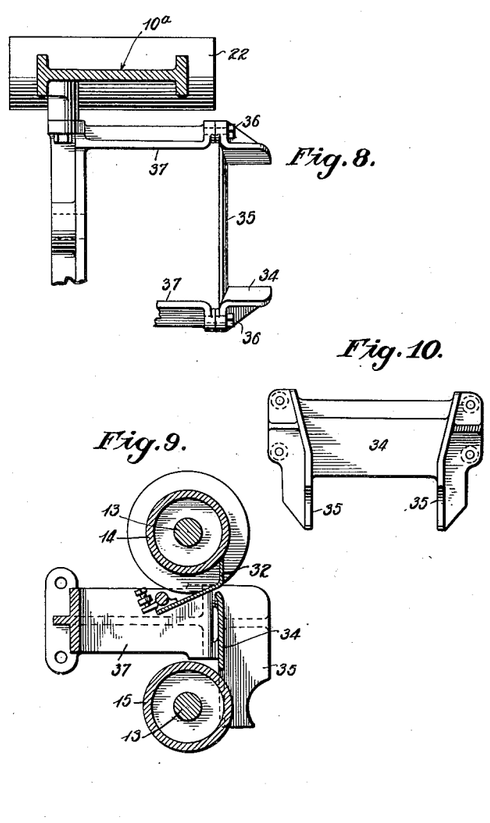
Figs. 8, 9 and 10 are detail views of the guide means for directing the dough from one set of sheeting rolls to the other set of sheeting rolls.

For removing dough that may adhere to the roll 17 of the upper pair of sheeting rolls there is a scraper 26, preferably a spring steel plate fastened to a tubular bracket 27 journaled in bearings carried by end plates 28 which are carried at the inner ends of spindles 21. For adjusting the scraper 26 with respect to the roll 17 the tubular bracket 27 is provided at its ends with ears 29 and formed on the end plates 28 are lugs 30 in which there are set screws 31 located to engage the ears 29 whereby the brackets 27 may be rocked on their bearings for adjusting the scraper. Scrapers of the same construction are also provided for the sheeting roll 14 and for roll 17 of the lower pair of sheeting rolls, these scrapers being shown in Fig. 1 at 32 and 33, respectively. Between the upper and lower sets of sheeting rolls there is provided a deflecting plate 34 which serves to guide the dough passing from the upper rolls to the space between the lower rolls. This deflecting plate has aprons 35 formed at its side edges and said plate is attached by bolts 36 to bracket 37 which in turn is carried by the upper frame extensions 10a as shown in Figs. 7 to 9.

Figure 1:
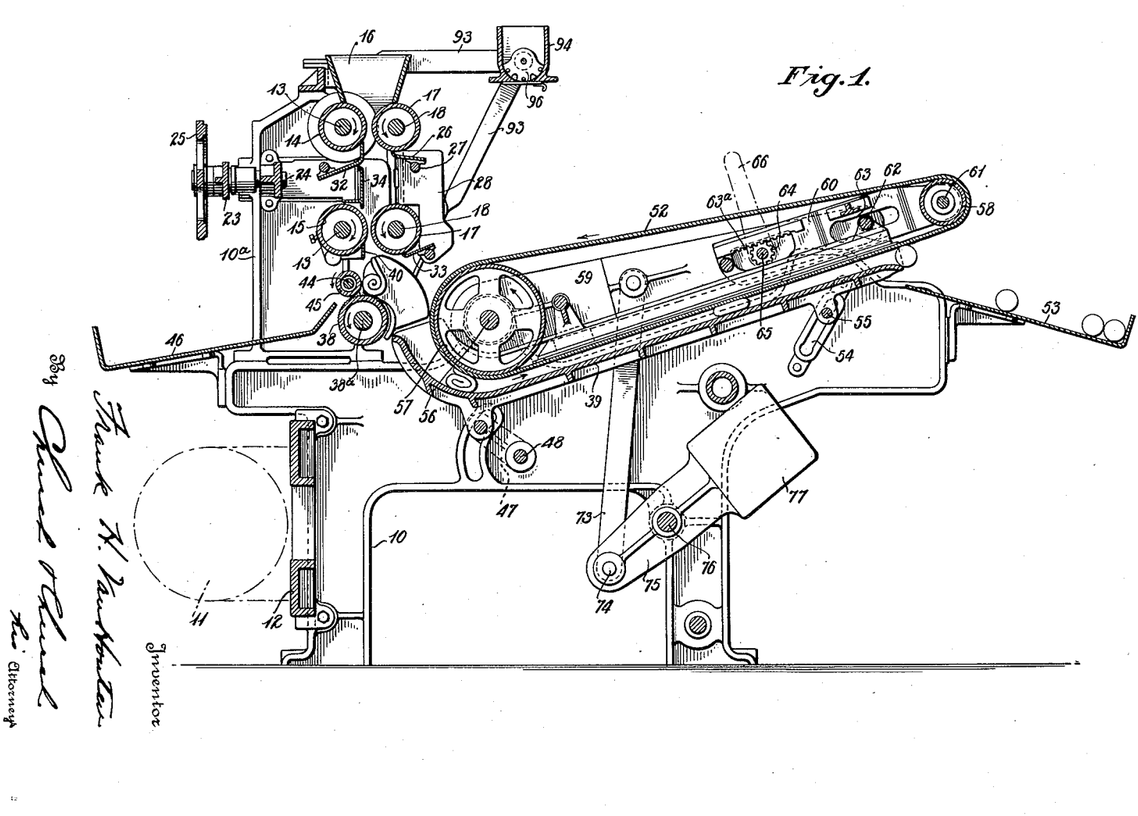
Figure 1 is a longitudinal sectional view of the machine.
Figure 4:
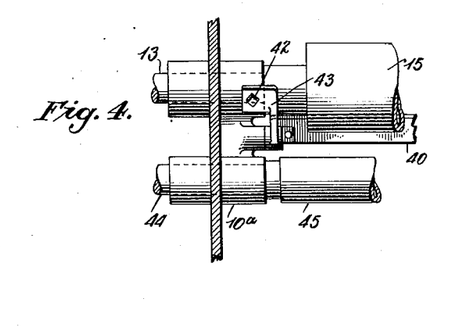
Figs. 4 and 5 are detail views of a member which acts as the detector for detecting abnormal lumps of dough and which may also act as a scraper for one of the sheeting rolls.
Figure 5:
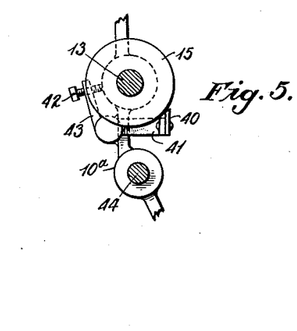
Figure 6:
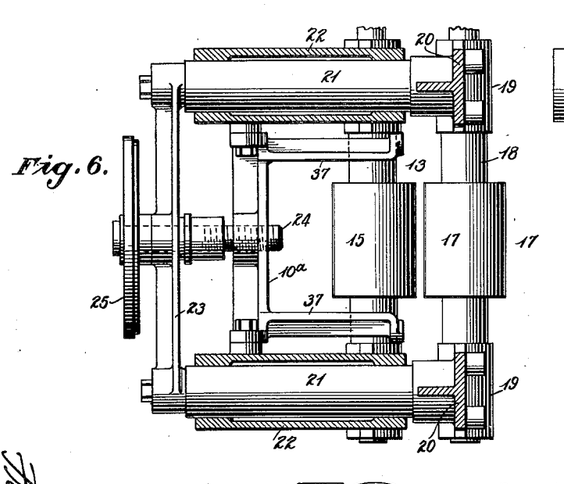
Fig. 6 is a top plan view, partly in section, illustrating the mechanism for adjusting the sheeting rolls.

As the dough, which is reduced to sheetlike form by the sheeting rolls just described, passes below the lower set of rolls 15, 17, it comes into contact with a roller 38 which, for convenience will be termed a "curler" roll whose function is to throw the end of sheeted dough that has passed from rolls 15, 17 back against roll 45 and said roll, traveling in the same direction as roll 38, winds the sheet into a series of spirally arranged convolutions as shown in Fig. 1. This roller 38 is toothed and will retain the dough thereon until the sheet is substantially completely curled. If only a normal quantity of dough is contained in the sheet delivered to said roller, the resulting winding of dough, after being completely curled, will drop by gravity onto the pressure plate 39 of the kneading mechanism. However, it sometimes occurs that a double lump or an abnormal quantity of dough will pass between the sheeting rolls in a single piece and, if not deflected from the kneading mechanism, will pass to the latter in a lump or a roll of such size as to cause it to adhere to either the pressure plate 39 or the element of the kneading mechanism which cooperates with said pressure plate and which will hereinafter be described. In view of this, means are provided in the present instance for detecting pieces of dough of excessive size and deflecting them from the normal path of travel before they reach the pressure plate 39. The arrangement thus far found to be most satisfactory consists of a combined scraper and detector or catcher plate 40. This catcher plate is supported immediately below sheeting roll 15 by brackets 41 journaled in the frame extensions 10a, said bracket being free to pivot in its bearing whereby the plate 40 may be adjusted toward or from the roll 15 so that it may properly serve its function as a scraper. The plate 40 may be held in any adjusted position by the set screws 42 extending through ears 43 formed on brackets 41, said set screws engaging against the bearings of the lower shaft 13 for roll 15 (see Figures 4 and 5). Mounted on a transverse shaft 44 below the catcher plate 40 and in proximity to the toothed roller 38 is a threaded roll 45 which, by mechanism hereinafter described, is driven in the direction indicated by the arrow in Fig. 1. As the convolutions of dough are wound upon one another by the combined action of the curler roll 38 and threaded roll 45 and the resulting lump increases in size, if the sheet of dough is of such size that its end last to pass the sheeting rolls 15, 17 is free of such rolls before the resulting lump is of such size as to engage the plate 40 then said resulting lump is free to drop by its own weight off of the roller 38. However, if the quantity of dough in the sheet should be such that said last end of the sheet should not be free of the rolls 15, 17 by the time that the convolutions of dough have reached a size sufficient to engage or abut against the catcher plate 40 then, and in that event, the resulting lump of dough will be pinched, so to speak, between the threaded roll 45 and the abutment formed by the catcher plate 40. As a consequence, the threaded roll will practically seize the abnormal lump of dough and, rotating in the direction indicated by the arrow, will force it through the space between its periphery and the catcher plate 40 and eject it on to the platform 46. In other words, if the sheet of dough is of such size that it cannot pass free of the sheeting rolls 15, 17, and be completely curled and fall off of the curling roll 38 before it impinges against the abutment or catcher plate 40 it will be deflected from its normal travel to the kneading mechanism and deposited on the platform 46. In this way, unduly large lumps of curled dough which would ordinarily adhere to some portion of the kneading mechanism are prevented from reaching said mechanism.

It will be obvious that various forms of kneading mechanisms may be employed in connection with the novel features thus far described, but to facilitate adjustment of the kneading elements to various sizes of particles of dough and to facilitate cleaning the pressure plate 39 the kneading mechanism is preferably constructed as shown in the accompanying drawings. In this instance, one end of said pressure plate is carried in links 47 mounted on a shaft 48 in the main frame 10, said links having extensions provided with counterweights 49. For rocking shaft 48, and consequently the links 47, said shaft 48 is connected by links 50, 50a to a lever 51 whereby the end of the pressure plate carried by the links 47 may be raised or lowered as desired. As is usual, the lumps of dough are kneaded by an endless traveling belt 52 which causes said lumps of dough to travel longitudinally of the pressure plate to the discharge end thereof at which point they are deposited on the platform 53. It is essential that the pressure plate be always maintained in parallel relation to the cooperating reach of the belt 52 and for this purpose the main frame 10 is provided near the discharge end of said plate with guides 54 for the cross bar 55 which is carried by depending portions of the pressure plate. With this arrangement the point of connection between the links 47 and the pressure plate 39 and the longitudinal center of the cross bar 55 travel in unison during all adjustments of said pressure plate, as distinguished from said plate being rocked about a fixed center and as a consequence the plate is always maintained parallel to the cooperating reach of belt 52.

A convenient arrangement for removing the belt 52 from its normal position to permit cleaning of the pressure plate consists in having said belt carried by a frame pivoted at one end so as to swing clear of the surface of the pressure plate on which the lumps of dough travel. The specific construction employed in the present instance consists in having the shaft 56 of one roller 57 for said belt journaled in bearings in the main frame and the other roller 58 for said belt journaled in a supplemental frame which is adapted to pivot on said shaft 56. This supplemental frame consists of side members each composed of sections 59 pivoted on the shaft 56 and section 60 carrying the shaft 61 of roller 58, the side members being made sectional for the purpose of permitting their length to be varied and the belt 52 to be properly tensioned on said rollers. The side sections 60 of said frame may be connected by a transverse brace and are guided by the cross member 62 between sections 59 projecting through slots 63 in said sections 60. At their ends remote from roller 58 the sections 60 are provided with racks 63a which are in engagement with pinions 64 carried by a shaft 65 journaled in the side sections 59 and said shaft is provided at one of its exposed ends with an operating handle 66 for rotation thereof. As will be readily understood rotation of the shaft 65 in one direction will run rack 63a and side section 60 in one direction to lengthen the frame and put the belt 52 under greater tension while rotation of the shaft 65 in the opposite direction will effect a reverse movement of the racks 63a and side sections 60 to slacken said belt. To maintain the two rollers 58 and 57 in any desired spaced relation the shaft 65 has a ratchet 67 mounted thereon which is engaged by a pawl 68 pivoted on one of the side sections 59.

Figures 11, 12, 13, 14, 15:
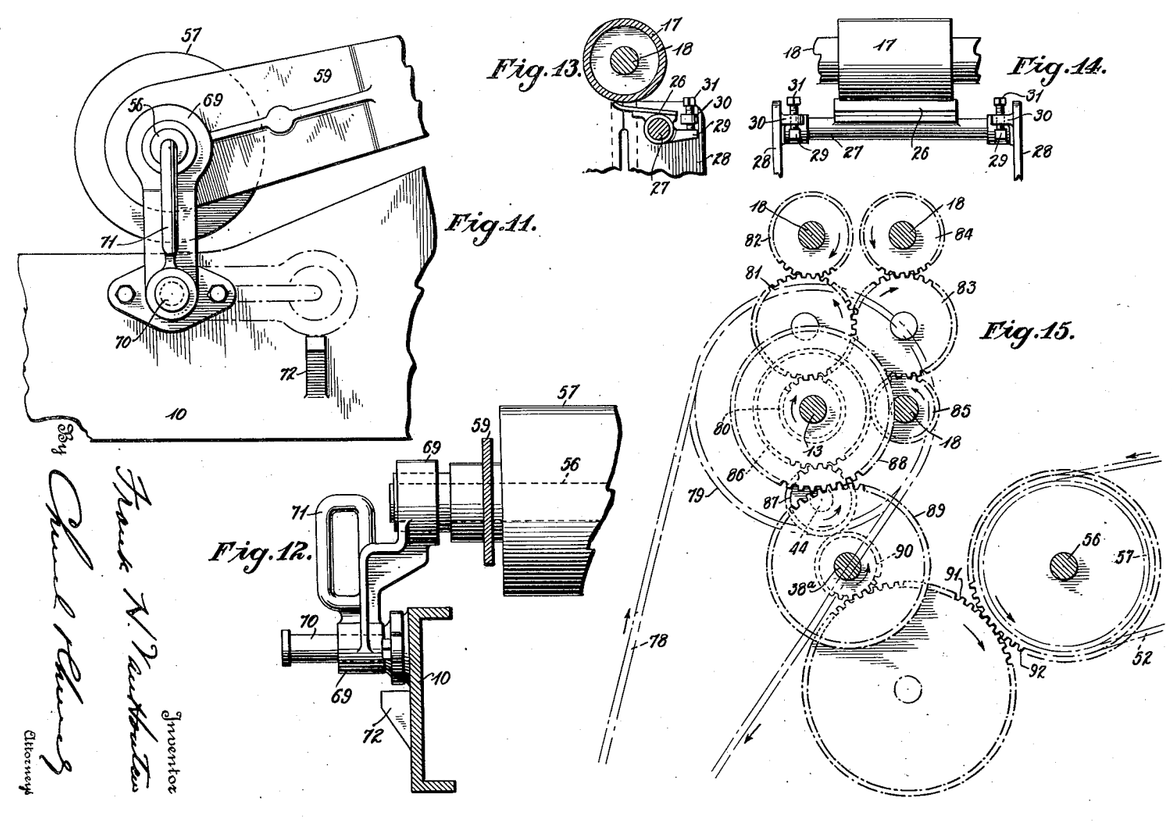
Fig. 11 is an elevational view showing in detail the detachable bearing for one of the belt rollers of the belt supporting frame.
Fig. 12 is a transverse sectional view of the structure shown in Fig. 11.
Figs. 13 and 14 are detail views of the preferred form of scraper for the sheeting rolls.
Fig. 15 is a diagrammatic lay-out of the driving connections for the several parts of the machine.

This arrangement of having the belt frame supported only by the shaft 56 of roller 57 is quite advantageous in that, in connection with another structural feature, it lends itself to a quick removal of the belt 52 from the rollers 57, 58. This additional feature just referred to consists in having one of the bearings for shaft 56 so arranged that it can be removed from said shaft and turned aside so that there will be no obstructions preventing the belt being removed laterally of the rolls. This feature is clearly shown in Figs. 11 and 12 wherein the bearing 69 for one side section 59 is illustrated as being slidably mounted on a short shaft 70 mounted on the main frame 10, said shaft 70 being bolted to said frame and having its outer end headed up to prevent total removal of the bearing except by unbolting said shaft 70 from the frame 10. The bearing 68 is provided with a hand grip 71 and when it is desired to place the belt upon or remove said belt from the rollers 57, 58, it is only necessary to grasp the hand grip 71, slide the bearing laterally of the machine on the shaft 70 and turn it to one side, a lug 72 being formed on the frame 10 on which said bearing may rest, as shown in dotted lines in Fig. 11, when this is done. When the bearing 69 has thus been removed there will be no obstructions at one side of the machine to prevent placing the belt on its rollers or removing it therefrom, it being understood that the shaft 56 will be properly supported by its bearing at the opposite side of the machine. It might also be added that in case of removing the belt from its rollers said belt should be first slackened on said rollers by manipulation of the operating handle 66 and shaft 65 as before described.

Figure 2:
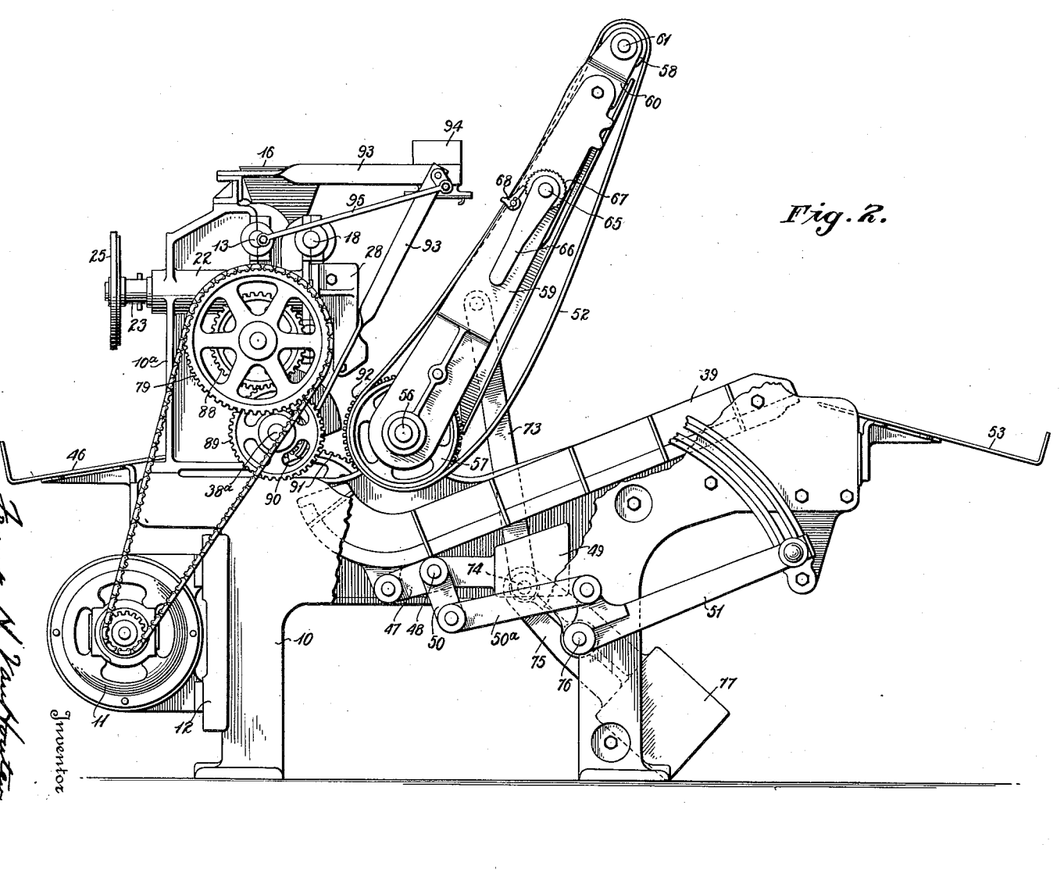
Fig. 2 is a side elevation, partly broken away, of a machine embodying the present improvement.
Figure 3:
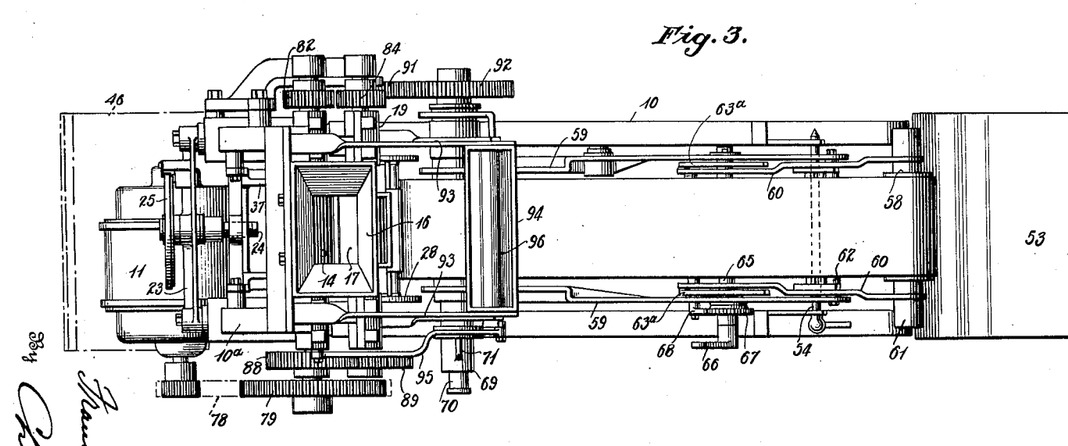
Fig. 3 is a top plan view.

For removing the entire belt frame and belt from proximity to the pressure plate when it is desired to clean the latter, the entire belt frame is adapted to be swung on the shaft 56 to the position shown in Fig. 2. The connections for raising the belt frame to this elevated position may consist of links 73 connected to the side sections 59 of the belt frame and to a shaft 74 carried by links 75 pivoted intermediate their ends on a shaft 76, said links 75 having a suitable counterweight 77 thereon to aid in actuating said belt frame.

For driving the various parts of the machine, power is transmitted from the motor 11 by a sprocket chain 78 to sprocket 79 on the shaft 13 of the lower set of sheeting rolls 15, 17. From said shaft motion is transmitted by a gear 80 through idler gear 81 to a gear 82 on the shaft 13 of the upper pair of sheeting rolls and from said idler gear 81 motion is also transmitted to idler gear 83 to gears 84, 85 on the shafts 18 carrying the sheeting rolls 17 of both the upper and lower sets of sheeting rolls. Mounted on the lower shaft 13 is a second gear 86 which drives the gear 87 on the shaft 44 carrying the threaded roll 45 for curling the normal lumps of dough and for ejecting the abnormal lumps of dough. Also mounted on the shaft 13 common to gears 80, 86 is a third gear 88 which meshes with a gear 89 mounted on the shaft 38a of the curling roller 38 and mounted on said shaft 38a is a gear 90 meshing with an idler gear 91, which, in turn, meshes with a gear 91 mounted on the shaft 56 which carries the roller 57 for the kneading belt 52. These connections may be clearly followed from the diagrammatical lay-out given in Fig. 15. For clarity, it might be stated that all the gears with the exception of idlers 81, 83 and 91 are mounted on shafts extending across the machine. These three idlers, however, are simply journaled on studs attached to the exterior face of the main frame.

Attached to the upper extensions 10a of the frame, at suitable points, are supports 93 for a duster 94 from which flour may be distributed on the kneading belt 52. The discharge of flour from the bottom of the duster box is accomplished by the distributor 96 which is pivoted in said box and which is adapted to be rocked on its bearings by the pitman 95 connected eccentrically to the upper shaft 13 of the sheeting rolls.

What I claim is:

1. In a dough molding machine, the combination of a frame, a hopper, sheeting rolls, an elongated pressure plate on which lumps of dough are dropped from said rolls, a dough engaging member between which and said plate the lumps of dough are pressed and kneaded, means for moving said member longitudinally of the plate to convey the lumps of dough along said plate, said dough engaging member being pivoted in said frame at its feeding-in end, and means for elevating the opposite end of said member to expose the surface of said plate throughout substantially its entire length.

2. In a dough molding machine, the combination of a frame, a hopper, sheeting rolls, an elongated pressure plate on which lumps of dough are dropped from said rolls, a swingable dough engaging member between which and said plate the lumps of dough are pressed and kneaded, said member being pivoted at its feeding-in end in said frame, means for moving said member longitudinally of the plate to convey the lumps of dough along said plate, and means for adjusting the plate toward and from said traveling member to regulate the pressure exerted on the lumps of dough.

3. In a dough molding machine, the combination of a frame, a hopper, sheeting rolls, an elongated pressure plate on which lumps of dough are dropped from said rolls, a dough engaging member between which and said plate the lumps of dough are pressed and kneaded, said member being pivoted at its feeding-in end in said frame, means for moving said member longitudinally of the plate to convey the lumps of dough along said plate, means for adjusting the support toward and from said traveling member to regulate the pressure exerted on the lumps of dough, and means for elevating the dough engaging member about its pivotal axis to expose the surface of said plate throughout substantially its entire length.

4. In a dough molding machine, the combination of a hopper, sheeting rolls, a pressure plate on which lumps of dough are delivered from said rolls, an endless traveling belt cooperating with said plate to move the lumps of dough along said plate and knead said dough, a frame supporting said belt, and means for elevating said belt frame to expose the surface of said plate to facilitate cleaning the latter.

5. In a dough molding machine, the combination of a hopper, sheeting rolls, a pressure plate on which lumps of dough are delivered from said rolls, an endless traveling belt cooperating with said plate to move the lumps of dough along said plate and knead said dough, a frame supporting said belt, said frame being pivoted near one end thereof, means for swinging said frame on its pivot away from the pressure plate, and means for adjusting said plate toward and from the belt frame.

6. In a dough molding machine, the combination of a hopper, sheeting rolls, a pressure plate on which lumps of dough are delivered from said rolls, an endless traveling belt cooperating with said plate to move the lumps of dough along said plate and knead said dough, a frame supporting said belt, said frame being pivoted near one end thereof, means for swinging said frame on its pivot away from the pressure plate, means for adjusting said plate toward and from the belt frame, and means for maintaining the pressure plate parallel to the cooperating reach of said traveling belt.

7. In a dough molding machine, the combination of a hopper, sheeting rolls, a main frame, a pressure plate to which lumps of dough are delivered from said rolls, a belt supporting frame pivoted on said main frame, a pair of rollers journaled in said frame, an endless traveling belt carried on said rollers cooperating with said plate to move the lumps of dough along said plate and knead the same, and means for adjusting said belt rollers toward and from each other in said belt frame to tension said belt, a bearing of one of said rollers serving as a support for said belt frame and being removable to permit removal of the belt.

8. In a dough molding machine, the combination of a hopper, sheeting rolls, a main frame, a pressure plate to which lumps of dough are delivered from said rolls, a belt supporting frame pivotally supported on the main frame, said supporting frame having sectional side bars, rollers having shafts extending through the side bar sections, an endless belt on said rollers, and means for moving one section of each of said side bars longitudinally of the other to adjust the rollers toward and from each other and regulate the tension of said belt, one of said belt carrying rollers having a removable bearing at one end of the belt supporting frame and the other roller being journaled in said frame and movable with said frame toward and from the pressure plate, said removable bearing being located at one side of the belt supporting frame and supporting said belt frame from the main frame.

9. In a dough molding machine, the combination of a main frame, a hopper, sheeting rolls, a pressure plate to which lumps of dough are delivered from the sheeting rolls, a shaft journaled in bearings on the main frame, a supplemental frame on said shaft, a shaft journaled in said supplemental frame, a belt carrying roller on each of said shafts, and an endless belt on said rollers, one of the bearings in the main frame being located at one side of the supplemental frame and removable from said shaft to permit removal of the belt from said rollers.

10. In a dough molding machine, the combination of a main frame, a hopper, sheeting rolls, a pressure plate to which lumps of dough are delivered from the sheeting rolls, a supplemental frame, bearings on said main frame on which the supplemental frame is supported, an endless belt carried by said supplemental frame adapted to cooperate with the pressure plate said belt being located between the bearings for the supplemental frame, one of the bearings for said supplemental frame being detachable from the supplemental frame.

11. In a dough molding machine, the combination of a main frame, a hopper, sheeting rolls, a pressure plate to which lumps of dough are delivered from the sheeting rolls, and a belt supporting frame pivotally carried on bearings in the main frame whereby said frame may be rocked toward and from the pressure plate, said pressure plate being located beneath said belt frame, one of the bearings for said belt frame being removable to facilitate placing a belt on or removing it from said frame.

12. In a dough molding machine, the combination of a main frame, a hopper, sheeting rolls, a pressure plate to which lumps of dough are delivered from the sheeting rolls, and a belt supporting frame extending over said pressure plate and pivotally carried on bearings in the main frame whereby said frame may be rocked toward and from the pressure plate, one of the bearings for said belt frame being removable to facilitate placing a belt on or removing it from said frame, and means for adjusting the pressure plate toward and from the belt supporting frame.

13. In a dough molding machine, the combination of a main frame, a hopper, sheeting rolls, a pressure plate to which lumps of dough are delivered from the sheeting rolls, and a belt supporting frame extending over said pressure plate and pivotally carried on bearings in the main frame whereby said frame may be rocked toward and from the pressure plate, one of the bearings for said belt frame being removable to facilitate placing a belt on or removing it from said frame, and means for rocking said belt supporting frame on its supporting bearings in the main frame.

14. In a dough molding machine, the combination of a main frame, a hopper, sheeting rolls, a pressure plate to which lumps of dough are delivered from the sheeting rolls, and a belt supporting frame extending over said pressure plate and pivotally carried on bearings in the main frame whereby said frame may be rocked toward and from the pressure plate, one of the bearings for said belt frame being removable to facilitate placing a belt on or removing it from said frame, means for rocking said belt supporting frame in its supporting bearings, and means for adjusting the pressure plate toward and from the belt supporting frame while maintaining said plate parallel to the cooperating reach of the belt carried by said frame.

15. In a dough molding machine, the combination with the hopper and kneading mechanism, of sheeting rolls between which lumps of dough are adapted to pass from said hopper to reduce individual lumps to sheet-like formation, means for rolling each sheet of dough spirally into a lump preparatory to the same being delivered to the kneading mechanism, and means for diverting a spirally rolled lump of dough from said kneading mechanism when said lump exceeds a predetermined size.

16. In a dough molding machine, the combination with the hopper and kneading mechanism, of sheeting rolls between which lumps of dough are adapted to pass from said hopper to reduce individual lumps to sheet-like formation, a roller to which the sheets are successively delivered from the sheeting rolls for supporting and curling the sheet into a lump preparatory to the same being delivered to the kneading mechanism, an abutment against which the convolutions of such spirally curled lump may impinge, and means engaging said spirally curled lump and cooperating with said abutment to divert said lump from the kneading mechanism.

17. In a dough molding machine, the combination with the hopper and kneading mechanism, of sheeting rolls between which lumps of dough are adapted to pass from said hopper to reduce individual lumps to sheet-like formation, a roller to which the sheets are successively delivered from the sheeting rolls for supporting and curling the sheet into a lump preparatory to the same being delivered to the kneading mechanism, an abutment against which the convolutions of such spirally curled lump may impinge, and a second roller engaging the spirally curled lump while the same is supported on the curling roller and adapted, in conjunction with said abutment, to divert the spirally curled lump of dough from the kneading mechanism when said lump exceeds a predetermined size.

18. In a dough molding machine, the combination with a main frame, a hopper, and kneading mechanism, of a plurality of guides in said frame, a spindle in each of said guides extending through said frame, a plurality of bearings carried by said spindles, a series of sheeting rolls journaled in said bearings, a second series of sheeting rolls journaled in the frame and opposed to the rolls of the first mentioned series, and means connected to said frame for moving said spindles in said guides for adjusting the rolls carried by said spindles with respect to the rolls journaled in the main frame.

19. In a dough molding machine, the combination with a main frame, a hopper, a kneading mechanism, of a plurality of guides in said frame, a spindle in each of said guides extending through said frame, a plurality of bearings carried by said spindles at one side of said frame, a series of sheeting rolls journaled in said bearings, a second series of sheeting rolls journaled in the frame and opposed to the rolls of the first mentioned series, and means at the opposite side of said frame for moving said spindles in said guides for adjusting the rolls carried by said spindles with respect to the rolls journaled in the main frame, each of said spindles having an end extending to the exterior of the main frame, a cross bar connecting the exposed ends of said spindles, a screw extending through said cross bar and threaded in the frame, said cross bar being held against longitudinal movement on said screw, and means for rotating said screw to adjust the spindles in their guides.

20. In a dough molding machine, the combination of a frame, a hopper, a pair of sheeting rolls journaled in said frame, a pair of spindles extending through said frame, a pair of sheeting rolls journaled between said spindles at one side of the frame and opposed to the first mentioned rolls, and means at the opposite side of said frame connected to said spindles for reciprocating them in the frame to adjust the rolls carried thereby with respect to the first mentioned rolls.

FRANK H. VAN HOUTEN.